UNITED STATES PATENT OFFICE.

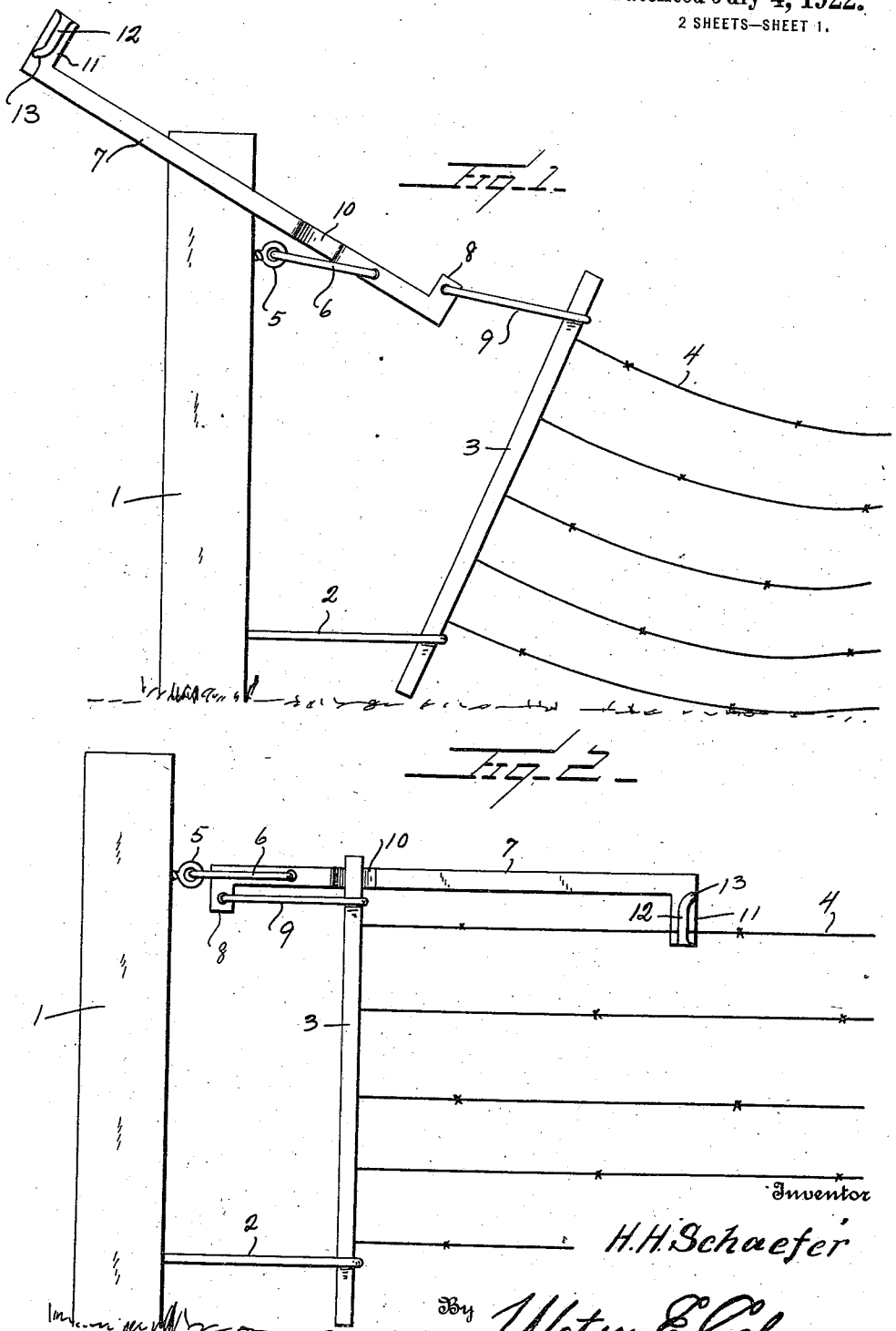

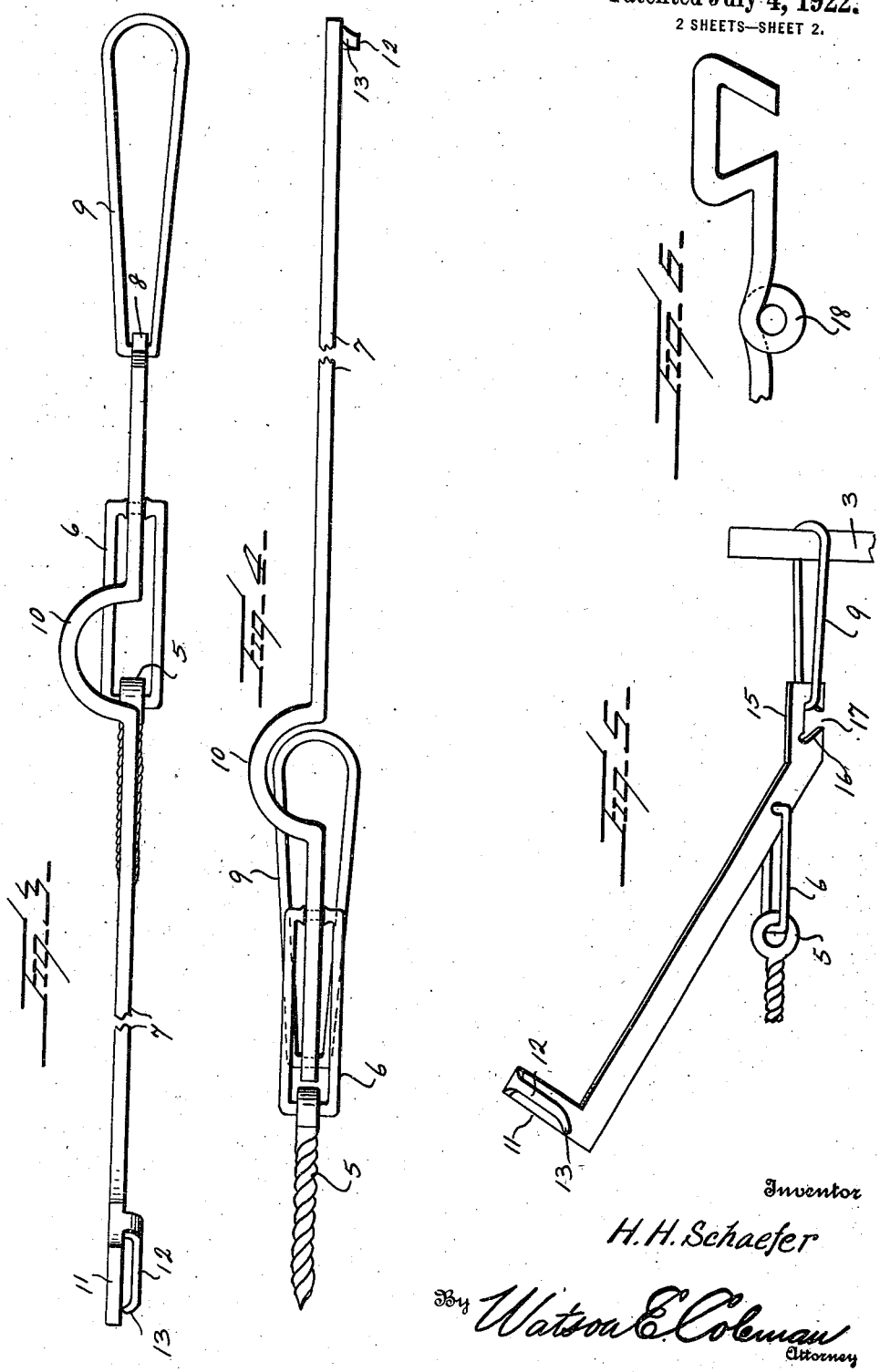

HENRY H. SCHAEFER, OF WELDONA, COLORADO.

GATE FASTENER.

1,421,573.             Specification of Letters Patent.      Patented July 4, 1922.

Application filed July 23, 1921. Serial No. 487,040.

*To all whom it may concern:*

Be it known that I, HENRY H. SCHAEFER, a citizen of the United States, residing at Weldona, in the county of Morgan and State of Colorado, have invented certain new and useful Improvements in Gate Fasteners, of which the following is a specification, reference being had to the accompanying drawings.

This invention relates to gate fasteners and more particularly to wire gate fasteners or tighteners.

The principal object of the invention is to provide a simple and efficient device of this character which hangs down out of the way when disconnected from the gate so that it is out of the way when stock or wagons are passing through the gate and cannot be broken.

A further object of the invention is the provision of a gate fastener or tightener of this character having a movable or shiftable fulcrum so that it may hang down out of the way of stock or wagons passing through the gate and thereby avoid the objection common to most fasteners of this type.

Another object of the invention is the provision of a simple and efficient device of this character which is readily attachable to any gate post by the simple application of an eye-bolt or screw, and which may be adjusted by the same attaching means.

Another object of the invention is the provision of a novel locking lever which when engaged with the wire of the gate cannot become accidentally disconnected therefrom by jars or tension placed upon the gate by animals.

Further objects of the invention will appear as the following specific description is read in connection with the accompanying drawings which form a part of this application and in which—

Figure 1 is an elevation showing the gate fastener attached and in inoperative position;

Figure 2 is a similar view showing the fastener in operative position to fasten and tighten the gate;

Figure 3 is an enlarged detail top plan view with the lever thrown to inoperative position;

Figure 4 is a similar view with the lever in operative tightening position;

Figure 5 is a perspective view of a modified form of latching lever; and

Figure 6 shows a detail elevation of a further modification.

Referring to the drawings and more particularly the Figures 1 to 4, 1 represents an ordinary gate-post to which is attached a customary gate-stick loop 2 which may be in the nature of an eye-bolt or a wire loop adapted to receive the gate-stick or panel-bar 3, to which the wire panels 4 are secured. The opposite side of the gate has not been shown as this part of the gate forms no part of my invention and the wires may be either attached directly to a post or to a gate-stick similar to 3, pivoted to the post at both ends, as is found most desirable.

Threaded into the post at the proper level is a screw-eye 5. It is of course understood that this may be a screw-bolt passing through the post if this form is found more desirable, but as either may be adjusted in the post to take up slack, the illustration of the screw-eye will suffice to illustrate the principle.

Attached to this screw-eye is a closed link 6 whose opposite end is passed through the latch lever 7, made as shown in Figures 1 and 3, of a flat metal bar, or as shown in Figure 6 of a round metal rod, as is found most desirable in practice. At one end the lever is provided with an apertured offset 8 on to which a gate engaging link 9 is pivoted. The link 9 is shown in Figure 3 to be a closed link larger at one end than at the other so as to provide sufficient space between its sides to engage over the gate-stick or panel bar of relatively large size. The link 9 may be made of flexible wire cable if desired.

Intermediate the length of the lever 7, I provide a lateral offset 10 for a purpose to be hereinafter described, and at the opposite or free end of the lever there is an offset extension 11 bent back upon itself to form a wire-engaging hook 12 whose end is inturned and slightly laterally offset, as shown at 13, to prevent accidental disengagement of the hook from the wire.

In the operation of the device, when the gate is closed the gate-stick or panel bar has its lower end inserted in the member 2. The link 9 is then placed over the upper end of the gate-stick and the free end of the lever moved over so as to engage the hook with the wire 4 of the gate, as shown in Figure 2. In this position it will be seen that the offset 10 accommodates the gate-stick, and were it not for such offset the lever would have to be sprung around the same each time that the gate was closed.

In the construction shown in Figure 5 the lever 14 is constructed of a flat bar of metal, as in Figures 1 to 4, but in this instance the offset end 15 is offset about 45° from the plane of the lever and is provided on one edge with a triangularly shaped notch 16 having an attenuated entrance or mouth 17 through which the link 9 is inserted into the notch. This form of latch and tightening lever is employed preferably where the link 9 is attached permanently to the gate-stick or panel bar 3 on relatively high gates.

In the form shown in Figure 6 the link 9 can be permanently attached to the lever or it can be detachably connected as in Figure 5, as will be readily understood. In this form the lever is made of round stock and the eye for the link 6 is formed by making a loop 18 in the length of rod, as is clearly shown.

It will be clearly seen from the foregoing that I have provided a very simple and efficient gate fastener which may be attached to the gate-post by simply securing screw-eyes or screw-bolts therein, and such a construction as will permit the locking lever and associated parts to drop down and hang out of the way when the gate is open so as not to be interfered with by the passage of stock or wagons through the gate. The construction is such that even though the mechanism should be engaged by an animal or wagon in passing through the gate that it would either swing about the fulcrum of the link 6 on the screw-eye 5, or the fulcrum on the link 6 of the lever 7, and thereby avoid any breakage.

What I claim is:

1. In a wire gate fastener, the combination with a support, of a securing member adjustably attached to the support, a locking lever, a link pivotally connected intermediate the ends of the locking lever and pivoted to the securing member to swing about the member as a vertical axis, and a link arranged for connection between a part on the gate and one end of the lever.

2. In a wire gate fastener, the combination with a support, of a securing member adjustably attached to the support, a link universally connected to the securing member, a lever pivoted intermediate its ends to the link, a second link arranged for connection with part of the gate and one end of the lever, and a hook on the opposite end of the lever for engagement with a part of the gate.

3. In a wire gate fastener, the combination with a supporting post, of a screw-eye attached thereto, a link universally connected to the screw-eye, a lever pivoted to said link, a second link arranged for connection between the gate-stick and one end of the lever, and a hook on the opposite end of the lever for engagement with the wire of the gate.

4. In a wire gate fastener, the combination with a supporting post, of a supporting member attached thereto, a link universally connected to the supporting member, a lever pivoted to said link intermediate its ends, a link arranged for connection between the gate-stick and one end of the lever, a hook on the opposite end of the lever for engaging with the wire of the gate, and an offset in the lever arranged to receive the gate-stick.

5. In a wire gate fastener, the combination with a gate post, of a securing member adjustably mounted thereon, a link universally connected to the securing member, a lever pivoted intermediate its length to the link, a second link pivoted to one end of the lever and arranged to engage over the gate-stick, a hook arranged on the opposite end of the lever to engage under the top wire of the gate, and an offset in the lever for receiving the gate-stick.

In testimony whereof I hereunto affix my signature.

HENRY H. SCHAEFER.